United States Patent Office 3,516,977
Patented June 23, 1970

3,516,977
PROCESSABILITY OF ELASTOMERS HAVING A NARROW MOLECULAR WEIGHT DISTRIBUTION
Emmett Burton Reinbold, Cuyahoga Falls, Ohio, assignor to The General Tire & Rubber Company, a corporation of Ohio
No Drawing. Continuation-in-part of application Ser. No. 431,445, Feb. 9, 1965. This application May 15, 1967, Ser. No. 638,658
Int. Cl. C08d 5/00
U.S. Cl. 260—94.7         1 Claim

ABSTRACT OF THE DISCLOSURE

Less than one part of a polyfunctional aromatic amine is incorporated into a rubbery composition containing a synthetic elastomer with a narrow molecular weight distribution, the purpose of said amine being to improve the processing characteristics of the composition. The amine, N,4-dinitroso-N-methyl aniline, can be used with polymers such as polybutadiene, styrene-butadiene rubber and butyl rubber which have been prepared, for example, by the solution polymerization of a suitable monomer.

---

This application is a continuation-in-part of Ser. No. 431,445, filed Feb. 9, 1965, now abandoned.

BACKGROUND OF THE INVENTION

Historically, it has been a common practice to utilize natural rubber, of the type obtained as a rubber latex from the tree *Hevea brasiliensis* in the production of elastomeric products such as pneumatic tires for passenger cars and trucks. It was soon found that the various properties of the natural rubber could be modified and improved by blending it with certain synthetic rubbers such as polybutadiene or SBR. Polybutadiene is a homopolymer of butadiene while SBR typically comprises a copolymer of 15–30% styrene and 85–70% butadiene. As an alternative, it was further found that the natural rubber could be entirely replaced by a synthetic rubber such as butyl rubber which is a copolymer of an iso-olefin, such as isobutylene, and a di-olefin, such as isoprene.

These various synthetic elastomeric polymers can be produced in a number of ways, including emulsion polymerization and solution polymerization. In emulsion polymerization, the conversion of monomeric materials, e.g. a mixture of butadiene and styrene, to polymers is carried out using a free radical polymerization initiator in an aqueous medium. Since the monomers and polymers are only slightly soluble in water, an emulsifying agent is employed to produce a stable dispersion of the elastomer in the water, this dispersion being called a latex. The polymer is later utilized in the form of the latex as originally made, or as a solid polymer after coagulation and drying. The resultant polymer is typically composed of very large chain-like molecules having approximately uniform composition with respect to ratio of butadiene and styrene residues. However, because of the unique qualities of the emulsion polymerization system, the polymer molecules are of widely different molecular weights; that is to say, widely different chain lengths. The spectrum of molecular weights present in a given sample of polymer is referred to as its molecular weight distribution (MWD). The term "broad MWD" refers to a wide range of molecular weights while "narrow MWD" refers to a narrow range. Emulsion polymers of SBR or polybutadiene typically have a broad MWD.

In solution polymerization, the monomers are converted to polymers while in a homogeneous solution of an organic solvent. If an ionic catalyst is used, the product will generally have an average molecular weight which is much more narrow than that obtained with the emulsion system. While polybutadiene and SBR-type polymers can be prepared by either the emulsion or solution system, the MWD is characteristically broad for the former and narrow for the latter system.

A rubber composition contains many ingredients which are included to modify the properties of the original polymer. Powerful equipment is required to mix the ingredients into the polymer and to form the unvulcanized rubber composition to the desired shape for fabrication. The MWD of the polymer is one of the factors influencing the ease of performing these processing operations.

It has been found that certain solution polymers have advantages over similar polymers produced by the emulsion polymerization technique. For example, polybutadiene, produced by solution polymerization, when blended with natural rubber or SBR and used in the construction of a pneumatic tire, serves to improve the abrasion, fatigue and cracking resistance of the rubber and in addition improves the low-temperatures flexibility, the resilience and the dynamic modulus of the product.

Attendant with these advantages are certain drawbacks, attributable to the narrow molecular weight distribution of these polymers. Processing difficulties normally preclude using large amounts of these polymers in products such as tire tread stocks. For example, a solution polymerized polybutadiene is very resistant to break-down on an open mill or in a Banbury mixer. Furthermore, it is very hard to process on warm-up mills, tubers or extruders and calenders without the use of high levels of plasticizers and carbon black loadings. This is one of the reasons that solution polymers are not normally used in amounts of more than about 50 parts per 100 parts of rubber hydrocarbon (RHC). In fact, at these higher levels there is a noticeable tendency for the uncured compound to exhibit low strength (referred to in the trade as "green strength") and to "bag" from the mill rolls during mixing. Furthermore, when extrusion is attempted, the compound does not readily feed into the barrel of the extruder. Consequently, the operator is unable to obtain a continuous and uniform extrusion, but instead obtains one which is discontinuous and irregular in dimension.

DESCRIPTION OF THE INVENTION

It is an object of the present invention to obviate some of the difficulties attendant with the use, in elastomeric compositions, of large amounts of polymers with narrow molecular weight distributions.

Another object is the use of a small amount of a polyfunctional aromatic amine, more specifically N,4-dinitroso-N-methyl aniline to improve the processing characteristics of rubber stocks containing a predominant amount of polymers with narrow MWD.

These and other objects are accomplished in the manner to be hereinafter more fully explained by incorporating less than one part and preferably less than .5 part per 100 parts of RHC of N,4-dinitroso-N-methyl aniline into a rubber during the compounding thereof. The addition of this material has been found to be useful in circumstances wherein a substantial amount of synthetic rubber, having a narrow MWD, is used in the formulation of the elastomeric compounds. Typical of these synthetic rubbers are polybutadiene, SBR and Butyl rubber when prepared by solution polymerization. By a substantial amount is meant that amount above which the compound becomes difficult to process and is typically more than 50 parts per 100 parts of rubber hydrocarbon.

Commercially, N,4-dinitroso-N-methyl aniline is sold as a 33% active product in a carrier comprising an inert clay and is marketed by Monsanto Company under the trade name "Elastopar." N,4-dinitroso-N-methyl aniline has been used for several years to improve the properties of butyl rubber vulcanizates and has also been used for the same purpose in various blends of rubbers such as SBR and natural rubber. It appears that the material serves as a vulcanization promoter by assisting the crosslinking between normally unreactive components such as the carbon black and the elastomeric material, or between the reactive sites of the dissimilar molecules of the different types of rubber. This results in a vulcanized product having improved modulus and hysteresis values.

These advantages were discovered at a time when most of the synthetic elastomers such as polybutadiene and SBR were produced by emulsion polymerization, as opposed to solution polymerization. It was not recognized that N,4-dinitroso-N-methyl aniline, useful in improving the properties of vulcanized elastomers polymerized by emulsion techniques, would also be useful in solving the totally different problem of difficult processing which exists in solution polymers having comparatively narrow molecular weight distributions.

It has now been found that rubber stocks having an elastomeric composition composed primarily of a polymer with a narrow molecular weight distribution can be extruded into smooth, uniform, continuous stocks, such as tread stocks, by the use of N,4-dinitroso-N-methyl aniline as a processing aid.

To further clarify the invention, but without the purpose of delimiting the same, the following example is presented to show the production of a typical tire tread compound. This compound has the following composition:

| Compound: | Parts by weight |
|---|---|
| Polybutadiene | 100 |
| HAF carbon black | 50 |
| Zinc oxide | 3 |
| Softener | 4 |
| Sulfur | 1.75 |
| Stearic acid | 2 |
| Elastopar (33% of N,4-dinitroso-N-methyl aniline) | .25 |

The polybutadiene is a high Cis (95%) rubber produced by the solution polymerization of butadiene using a Ziegler-type catalyst system. The polymer has a predominant molecular weight distribution in the 500,000 to 700,000 weight range. When the weight average molecular weight ($\overline{M}_w$) of the polymer is divided by the number average molecular weight ($\overline{M}_n$), a common method of determining and comparing molecular weight distribution, a value of 1.8 is obtained. For comparative purposes, as a polymer approaches homogeneity and the molecular weight distribution becomes very narrow, $\overline{M}_w/\overline{M}_n$ approaches unity. On the other hand, this figure may reach a value of several hundred for polymers having a broad molecular weight distribution and a high degree of heterogeneity. This ratio $\overline{M}_w/\overline{M}_n$ is commonly referred to as the heterogeneity index.

The polybutadiene, carbon black and Elastopar are blended together in a Banbury mixer for a period of one to three minutes, said mixer being preheated to about 130- F. During the mixing, the temperature rises through internal friction to about 365° F. The curvature, accelerators and anti-oxidants are added after the Elastopar has fully reacted with the elastomer and carbon black. The batch is then blended to homogeneity by passing it through the Banbury a second time or by mixing it on a three or four-roller mill of conventional design.

The resultant batch is then extruded through a tuber, the extension being carried out in a smooth and continuous manner to produce stock which is dimensionally uniform. It has been found that the batch in the example can be successfully extruded at about three times the rate of a similar batch formulated without the addition of Elastopar.

It has been found preferable to blend the narrow MWD polymer and the carbon black with the N,4-dinitroso-N-methyl aniline in the Banbury prior to the addition of the other components, including the curing agents, to reduce the tendency of the N,4-dinitroso-N-methyl aniline to cross-react with these other ingredients. Thus, the zinc oxide, sulfur, accelerator and stearic acid as well as the various antioxidants and the like, are added only after the N,4-dinitroso-N-methyl aniline has been fully reacted with the elastomer and the reinforcing carbon black, the time for this reaction usually ranging from one to three minutes.

As previously stated, the amount of N,4-dinitroso-N-methyl aniline used for a processing aid in the rubber stock is less than one part, and is preferably less than .5 part per 100 RHC. In the case of polybutadiene, exceeding this maximum amount results in a tendency for the elastomer to scorch while in the Banbury and during milling.

It is evident that the invention is not limited to the use of this modifying agent in the preparation of tread stocks alone, but instead is applicable to other situations where a polymer with narrow molecular weight distribution, such as a solution polymerized polymer, is used in an amount sufficient to produce processing difficulties. These polymers include polybutadiene, Butyl rubber and SBR as well as other elastomers which are normally difficult to process because of the molecular weight distribution. When the heterogeneity index of the elastomer is greater than about 3 or 4, the material can normally be processed through the mills and other equipment without the necessity of adding Elastopar. However, as this index approaches unity, there is a corresponding decrease in the ease of processability. Under such circumstances, the use of N,4-dinitroso-N-methyl aniline can facilitate the handling of the rubber.

Having thus described the invention, but with the intention of being bound only by the limitations of the foregoing claims, I claim:

1. The process of improving the extrusion rate through a screw extruder of a rubber compound containing at least 50 parts by weight of polybutadiene produced by solution polymerization, per 100 parts of rubber hydrocarbon wherein the ratio of the weight average molecular weight ($\overline{M}_w$) to the number average molecular weight ($\overline{M}_n$) of the polybutadiene is between about 1 and about 4, comprising blending less than about 0.5 part of N,4-dinitroso-N-methyl aniline into the rubber compound at elevated temperatures before extrusion, and extruding the composition.

References Cited

UNITED STATES PATENTS

| 3,264,254 | 8/1966 | Tung | 260—94.7 |
| 3,354,116 | 11/1967 | Gruver | 260—94.7 |

FOREIGN PATENTS 867,390  5/1961  Great Britain.

SAMUEL H. BLECH, Primary Examiner

M. J. TULLY, Assistant Examiner

U.S. Cl. X.R.

260—5, 32.6, 41.5, 85.1, 85.3; 264—176